(12) United States Patent
Kukehalli Subramanya et al.

(10) Patent No.: US 10,693,859 B2
(45) Date of Patent: Jun. 23, 2020

(54) RESTRICTING ACCESS FOR A SINGLE SIGN-ON (SSO) SESSION

(71) Applicant: Oracle International Corporation, Redwood Shores, CA (US)

(72) Inventors: Ramya Kukehalli Subramanya, Redmond, WA (US); Stephen Mathew, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/814,209

(22) Filed: Jul. 30, 2015

(65) Prior Publication Data

US 2017/0034152 A1 Feb. 2, 2017

(51) Int. Cl.
*H04L 29/06* (2006.01)

(52) U.S. Cl.
CPC ........ *H04L 63/0815* (2013.01); *H04L 63/102* (2013.01)

(58) Field of Classification Search
CPC .................................. H04L 63/00; G06F 21/00
See application file for complete search history.

(56) References Cited

U.S. PATENT DOCUMENTS

| 6,041,357 A | 3/2000 | Kunzelman et al. |
| 6,055,637 A | 4/2000 | Hudson et al. |

(Continued)

FOREIGN PATENT DOCUMENTS

| EP | 1864240 | 12/2007 |
| WO | 2013/049461 A2 | 4/2013 |

(Continued)

OTHER PUBLICATIONS

Gaur, N. IBM Extreme Transaction Processing (XTP) Patterns: Scalable and robust HTTP session management with WebSphere eXtreme Scale. ibm.com/developerworks/ [online]. May 27, 2009, IBM [retrieved Jan. 6, 2015]. Retrieved from the Internet: <URL: http://www.ibm.com/developerworks/websphere/library/techarticles/0905_gaur/0905_gaur.html>, 8 pages.

(Continued)

*Primary Examiner* — Joseph P Hirl
*Assistant Examiner* — Leynna Truvan
(74) *Attorney, Agent, or Firm* — Kilpatrick Townsend & Stockton LLP

(57) ABSTRACT

Techniques are disclosed for restricting access to resources accessible in a SSO session. An access management system may provide access one or more resources by implementing an SSO system to provide a SSO session. An SSO session may provide an authenticated user with access to protected resources to which the user is entitled to access. In some instances, a user sharing a computer with other users may want to access a particular protected resource so as to restrict other users sharing the computer from accessing other protected resources accessible to the user in an SSO session. The access management system may enable the user to dynamically choose, such as during login, the protected resources which to restrict and/or permit. Upon successful authentication, a session may be established for only those protected resources that are permitted based on the user's selection, while the other resources are restricted.

14 Claims, 7 Drawing Sheets

(56) References Cited

U.S. PATENT DOCUMENTS

| | | | |
|---|---|---|---|
| 6,076,108 A | 6/2000 | Courts et al. | |
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,430,619 B1 | 8/2002 | Sitaraman et al. | |
| 6,811,873 B2 | 11/2004 | Nadkarni | |
| 7,100,195 B1* | 8/2006 | Underwood | G06F 9/451 726/2 |
| 7,137,006 B1 | 11/2006 | Grandcolas et al. | |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,525,938 B2 | 4/2009 | Hurtta | |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,805,757 B2 | 9/2010 | Menten | |
| 7,818,582 B2 | 10/2010 | Marion et al. | |
| 7,886,000 B1 | 2/2011 | Polis et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,611,873 B2 | 12/2013 | Onyon et al. | |
| 8,627,435 B2 | 1/2014 | Sirota | |
| 8,627,479 B2 | 1/2014 | Wittenstein et al. | |
| 8,650,305 B2 | 2/2014 | Booth et al. | |
| 8,719,342 B2 | 5/2014 | Mutikainen et al. | |
| 8,738,774 B2 | 5/2014 | Sheng et al. | |
| 8,756,704 B2 | 6/2014 | Castellucci et al. | |
| 8,819,444 B2 | 8/2014 | Shahbazi et al. | |
| 8,843,997 B1* | 9/2014 | Hare | H04L 63/0281 709/200 |
| 8,898,765 B2 | 11/2014 | Goyal et al. | |
| 8,955,037 B2 | 2/2015 | Srinivasan et al. | |
| 8,990,909 B2 | 3/2015 | Kelley | |
| 9,083,690 B2 | 7/2015 | Subramanya et al. | |
| 9,104,451 B2 | 8/2015 | Subramanya et al. | |
| 9,124,582 B2 | 9/2015 | Kalinichenko et al. | |
| 9,225,744 B1 | 12/2015 | Behm et al. | |
| 9,230,003 B2 | 1/2016 | Goetsch | |
| 9,240,886 B1 | 1/2016 | Allen et al. | |
| 9,247,006 B2 | 1/2016 | Mathew et al. | |
| 9,405,887 B2 | 8/2016 | Yin et al. | |
| 9,509,684 B1 | 11/2016 | Dixson-Boles et al. | |
| 9,544,293 B2 | 1/2017 | Mathew et al. | |
| 9,769,147 B2 | 9/2017 | Mathew et al. | |
| 9,866,640 B2 | 1/2018 | Motukuru et al. | |
| 9,887,978 B2 | 2/2018 | Goel | |
| 9,887,981 B2 | 2/2018 | Mathew et al. | |
| 9,900,224 B2 | 2/2018 | Dumitriu et al. | |
| 10,009,335 B2 | 6/2018 | Mathew et al. | |
| 10,084,769 B2 | 9/2018 | Mathew et al. | |
| 10,157,275 B1 | 12/2018 | Venkatasamy et al. | |
| 10,454,936 B2 | 10/2019 | Koottayi et al. | |
| 10,505,982 B2 | 12/2019 | Motukuru et al. | |
| 2002/0029269 A1 | 3/2002 | McCarty et al. | |
| 2002/0078365 A1 | 6/2002 | Burnett et al. | |
| 2003/0105862 A1 | 6/2003 | Villavicencio | |
| 2003/0212887 A1* | 11/2003 | Walther | H04L 63/08 713/151 |
| 2004/0003259 A1 | 1/2004 | Chang | |
| 2004/0073666 A1* | 4/2004 | Foster | H04L 63/08 709/225 |
| 2004/0260810 A1 | 12/2004 | Bernoth | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1 | 6/2005 | Anuszewski et al. | |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0089167 A1 | 4/2007 | Villavicencio | |
| 2007/0147247 A1 | 6/2007 | Kalonji et al. | |
| 2007/0192326 A1 | 8/2007 | Angal et al. | |
| 2007/0220154 A1 | 9/2007 | El Husseini et al. | |
| 2008/0066159 A1 | 3/2008 | Dillaway et al. | |
| 2008/0113791 A1 | 5/2008 | Williams et al. | |
| 2008/0114883 A1 | 5/2008 | Singh et al. | |
| 2008/0294781 A1 | 11/2008 | Hinton et al. | |
| 2009/0037581 A1 | 2/2009 | Richardson et al. | |
| 2009/0037763 A1* | 2/2009 | Adhya | H04L 12/4641 714/4.12 |
| 2009/0047928 A1 | 2/2009 | Utsch et al. | |
| 2009/0089437 A1 | 4/2009 | Polozoff | |
| 2009/0132639 A1 | 5/2009 | Yan | |
| 2009/0216587 A1 | 8/2009 | Dwivedi et al. | |
| 2009/0292927 A1 | 11/2009 | Wenzel et al. | |
| 2010/0043062 A1 | 2/2010 | Alexander et al. | |
| 2010/0082989 A1 | 4/2010 | Bussard et al. | |
| 2010/0131755 A1 | 5/2010 | Zhu et al. | |
| 2010/0146611 A1 | 6/2010 | Kuzin et al. | |
| 2010/0154043 A1 | 6/2010 | Castellucci et al. | |
| 2010/0217837 A1 | 8/2010 | Ansari et al. | |
| 2010/0290392 A1 | 11/2010 | Rasanen et al. | |
| 2011/0010542 A1 | 1/2011 | Choi et al. | |
| 2011/0154443 A1 | 6/2011 | Thakur et al. | |
| 2011/0173643 A1 | 7/2011 | Nicolson et al. | |
| 2011/0185421 A1 | 7/2011 | Wittenstein et al. | |
| 2011/0277019 A1 | 11/2011 | Pritchard, Jr. | |
| 2011/0307615 A1 | 12/2011 | Krishnaswamy et al. | |
| 2012/0078708 A1 | 3/2012 | Taylor et al. | |
| 2012/0106333 A1 | 5/2012 | Lee et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0081130 A1 | 3/2013 | Huba et al. | |
| 2013/0086651 A1 | 4/2013 | Kavantzas et al. | |
| 2013/0086652 A1 | 4/2013 | Kavantzas et al. | |
| 2013/0185449 A1 | 7/2013 | Brzozowski | |
| 2013/0198818 A1 | 8/2013 | Hitchcock et al. | |
| 2014/0025939 A1 | 1/2014 | Smith et al. | |
| 2014/0068702 A1 | 3/2014 | Hyndman et al. | |
| 2014/0149280 A1 | 5/2014 | Karkhanis et al. | |
| 2014/0259109 A1 | 9/2014 | Houston et al. | |
| 2014/0282961 A1 | 9/2014 | Dorfman et al. | |
| 2014/0304773 A1 | 10/2014 | Woods et al. | |
| 2014/0344326 A1 | 11/2014 | Kamath et al. | |
| 2015/0059003 A1 | 2/2015 | Bouse | |
| 2015/0074407 A1 | 3/2015 | Palmeri et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 | 5/2015 | Eguchi | |
| 2015/0220713 A1 | 8/2015 | Beenau et al. | |
| 2015/0220926 A1 | 8/2015 | McLachlan et al. | |

(56) References Cited

U.S. PATENT DOCUMENTS

| | | |
|---|---|---|
| 2016/0004870 A1 | 1/2016 | Forte et al. |
| 2016/0065570 A1 | 3/2016 | Spencer, III et al. |
| 2016/0219040 A1 | 7/2016 | Mathew et al. |
| 2016/0232516 A1 | 8/2016 | Dayan et al. |
| 2016/0248758 A1 | 8/2016 | Mathew et al. |
| 2016/0285822 A1 | 9/2016 | Adams |
| 2016/0294607 A1 | 10/2016 | Davis |
| 2016/0380941 A1 | 12/2016 | Tanurdjaja et al. |
| 2016/0381000 A1 | 12/2016 | Mathew et al. |
| 2017/0085556 A1 | 3/2017 | Mathew et al. |
| 2017/0118218 A1 | 4/2017 | Koottayi et al. |
| 2017/0118222 A1 | 4/2017 | Subramanya et al. |
| 2017/0118249 A1 | 4/2017 | Motukuru et al. |
| 2017/0201524 A1 | 7/2017 | Dureau |
| 2018/0046794 A1 | 2/2018 | Mathew et al. |
| 2018/0077243 A1 | 3/2018 | Mathew et al. |
| 2018/0157825 A1 | 6/2018 | Eksten et al. |
| 2018/0191701 A1 | 7/2018 | Kong et al. |

FOREIGN PATENT DOCUMENTS

| | | |
|---|---|---|
| WO | 2015/042546 A1 | 3/2015 |
| WO | 2015/042547 A1 | 3/2015 |
| WO | WO2016051240 | 4/2016 |

OTHER PUBLICATIONS

IBM Security Access Manager for Enterprise Single Sign-On. Data Sheet [online]. Copyright 2013 IBM Corporation [retrieved on Feb. 12, 2015]. Retrieved from the Internet: <URL: http://onwireco.com/wp-content/uploads/2013/12/IBM_Security_Access_Manager_For_Enterprise_Single_Sign-On.pdf>, 8 pages.

Installing vCenter Single Sign-On in a multisite deployment (2034074). kb.vmware.com [online]. Copyright 2014 VMware, Inc. [retrieved Jan. 7, 2015]. Retrieved from the Internet: <URL: http://kb.vmware.com/selfservice/microsites/search.do?language=en_US&cmd=displayKC&externalId=2034074>, 2 pages.

Mortimore, C. and Yewell, E. Implementing Single Sign-On Across Multiple Organizations. developer.salesforce.com [online]. Copyright 2000-2014 salesforce.com, Inc. [retrieved Jan. 7, 2015]. Retrieved from the Internet: <URL: http://developer.salesforce.com/page/Implementing_Single_Sign-On_Across_Multiple_Organizationsx, 9 pages.

Multiple Data Centers. support.ca.com [online]. Copyright 2014 CA [retrieved Jan. 7, 2015]. Retrieved from the Internet: <URL: https://support.ca.com/ca.docs/0/CA%20SiteMinder%2012%2052%20SP1-ENU/Bookshelf_Files/HTML/idocs/index.htm?toc.htm?706393.html?intcmp=searchresultclick&resultnum=452>, 8 pages.

Oracle Enterprise Single Sign-On Suite Plus 11gR2 PS2. White Paper [online]. Jan. 2014, Oracle Corporation [retrieved on Jul. 30, 2015]. Retrieved from the Internet: <URL: http://www.oracle.com/technetwork/middleware/id-mgmt/esso-suite-technical-whitepaper-1519077.pdf>, 25 pages.

Stirpe, P. and Shah, A. Time-out Management in Multi-domain Single Sign-On. Strattagroup.com [online]. Copyright 2005 The Stratta Group [retrieved Jan. 6, 2015]. Retrieved from the Internet: <URL: http://www.strattagroup.com/tsg/pubs/ssotime-out.pdf>, 13 pages.

Symantec Identity: Access Manager. Data Sheet [online]. Copyright 2014 Symantec Corporation [retrieved on Feb. 12, 2015]. Retrieved from the Internet: <URL: http://www.symantec.com/content/en/us/enterprise/fact_sheets/b-symantec_identity_access_manager_DS_21227840>, 2 pages.

U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
U.S. Appl. No. 14/754,222, filed Jun. 29, 2015.

Haire, A Solution to SSO Authentication and Identity Management: Lessons Learned, Atlassian Blog, May 16, 2013, 5 pages.

U.S. Appl. No. 15/005,365, Final Office Action dated Mar. 10, 2017, 12 pages.

"Implementing Single Sign-On Across Multiple Organizations", Developer.force.com, http://wiki.developerforce.com/page/Implementing_Single_Sing-On_Across_Multiple_Organizations; Accessed on Dec. 19, 2013.

"BIG-IP Access Policy Manager", http://www.f5.com/pdf/products/big-ip-access-policy-manager-ds.pdf (copyright 2013).

"User Session Monitoring for CA Single Sign-On," CA Technologies, Copyright 2015 http://www.ca.com/~/media/Files/AddOnServicesComponents/user-session-monitor-for-ca-single-sign-on.pdf, 1 page.

"The art of logging out," KTH Sweden, Apr. 26, 2013 https://www.kth.se/social/group/cas/page/the-art-of-logging-out/, 2 pages.

"IBM Security Access Manager for Enterprise Single Sign-On" retrieved from the Internet Nov. 10, 2016: http://www-03.ibm.com/software/products/en/access-mgr-esso, 2 pages.

"Understanding Jive Mobile's SSO Compliance," Jive Software, Jun. 25, 2012 https://community.jivesoftware.com/docs/DOC-61829, 11 pages.

Ferguson, A. and Hockings, C. Session management server: Session transitions and state. ibm.com/developerworks/ [online]. Jun. 25, 2007, IBM [retrieved May 18, 2015]. Retrieved from the Internet: <URL: http://www.ibm.com/developerworks/tivoli/library/t-sms-states/>, 7 pages.

Impersonate another user: Dynamics CRM 2015. Copyright 2015 Microsoft [retrieved Jun. 25, 2015]. Retrieved from the Internet: <URL: https://msdn.microsoft.conn/en-us/library/gg334744.aspx>, 1 page.

Murdoch "Hardened Stateless Session Cookies," Lecture Notes in Computer Science, pp. 93-101 (2008).

Oracle Fusion Middleware Developer's Guide for Oracle Access Management: Developing an Application to Manage Impersonation. Copyright 2015 Oracle [retrieved on Jun. 26, 2015]. Retrieved from the Internet: <URL: https://docs.oracle.com/cd/E52734_01/oam/AIDEV/impersonation.htm#AIDEV422> , 11 pages.

Oracle Fusion Middleware Developing Web Applications, Servlets, and JSPs for Oracle WebLogic Server: Using Sessions and Session Persistence. Copyright 2015 Oracle [retrieved May 18, 2015]. Retrieved from the Internet: <URL: http://docs.oracle.com/cd/E12839_01/web.1111/e13712/sessions.htm#WBAPP301 >, 6 pages.

Oracle Fusion Middleware Performance and Tuning for Oracle WebLogic Server: Tuning Web Applications. Copyright 2015 Oracle [retrieved May 18, 2015]. Retrieved from the Internet: <URL: http://docs.oracle.com/cd/E12839_01/web.1111/e13814/webapptune.htm#PERFM368>, 3 pages.

Rivard, J. Clearing Novell Access Manager Application Sessions. Jan. 26, 2009, NetIQ [retrieved Jun. 13, 2016]. Retrieved from the Internet: <URL: https://www.netiq.com/communities/cool-solutions/clearing-novell-access-manager-application-sessions/>, 4 pages.

Volodarsky, M. ASP.NET: Fast, Scalable, and Secure Session State Management for Your Web Applications. Copyright 2015 Microsoft [retrieved May 18, 2015]. Retrieved from the Internet: <URL: https://msdn.microsoft.com/en-us/magazine/cc163730.aspx>, 9 pages.

Ye, W. A complete Impersonation Demo in C#.NET. Jun. 20, 2013, Code Project [retrieved on Jun. 25, 2015]. Retrieved from the Internet: <URL: http://www.codeproject.com/Articles/125810/A-complete-Impersonation-Demo-in-Csharp-NET>, 12 pages.

U.S. Appl. No. 14/135,053 , Final Office Action dated Jul. 6, 2015, 17 pages.

U.S. Appl. No. 14/135,053 , Non-Final Office Action dated Jan. 29, 2015, 16 pages.

U.S. Appl. No. 14/135,053 , Non-Final Office Action dated Nov. 25, 2015, 18 pages.

U.S. Appl. No. 14/135,053 , Notice of Allowance, dated May 20, 2016, 10 pages.

U.S. Appl. No. 14/137,775 , Non-Final Office Action dated May 22, 2015, 10 pages.

U.S. Appl. No. 14/137,775 , Notice of Allowance dated Sep. 16, 2015, 9 pages.

(56) References Cited

OTHER PUBLICATIONS

U.S. Appl. No. 14/491,076, Non-Final Office Action dated Mar. 11, 2016, 13 pages.
U.S. Appl. No. 15/005,365, Non-Final Office Action dated Aug. 24, 2016, 11 pages.
U.S. Appl. No. 14/135,053, Notice of Allowance dated Aug. 31, 2016, 9 pages.
U.S. Appl. No. 14/491,076, Final Office Action dated Oct. 25, 2016, 18 pages.
U.S. Appl. No. 14/491,076, Final Office Action dated Oct. 6, 2016, 19 pages.
U.S. Appl. No. 14/754,222 Non-Final Office Action, dated Dec. 1, 2016, 10 pages.
U.S. Appl. No. 14/754,222, Notice of Allowance dated May 17, 2017, 5 pages.
U.S. Appl. No. 15/143,240, Office Action dated Jun. 5, 2017, 11 pages.
U.S. Appl. No. 15/005,365, Notice of Allowance dated Sep. 27, 2017, 16 pages.
U.S. Appl. No. 15/372,342, Non-Final Office Action dated Oct. 20, 2017, 14 pages.
U.S. Appl. No. 14/491,076, Notice of Allowance dated Nov. 2, 2017, 11 pages.
U.S. Appl. No. 15/143,240, Final Office Action dated Dec. 15, 2017, 14 pages.
Dacosta et al., One-Time Cookies: Preventing Session Hijacking Attacks with Stateless Authentication Tokens, ACM Trans. Internet Technol. 12, 1, Article 1, 2012, 31 pages.
Pujolle et al., Secure Session Management With Cookies, 7th International Conference on Information, Communications and Signal Processing (ICICS), 2009, pp. 1-6.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration.pdf, Dec. 2016, 16 pages.
Dual Factor Authentication, Reliance, Oct. 24, 2016, 8 pages.
Multi-Data Center With Session Sharing, IBM Security Access Manager for Web, Version 7.0, Available Online at https://www.ibm.com/support/knowledgecenter/SSPREK_7.0.0/com.ibm.isam.doc_70/ameb_smsdeploy_guide/concept/c_multi_data_center_with_session.html, 2017, 3 pages.
RSA Adaptive Authentication, RSA Security product literature, Available Online at https://www.rsa.com/en-us/products/fraud-prevention/3d-secure-authentication, 2016, 4 pages.
The ABCs of ADCs, White Paper: ABCs of Application Delivery, Available Online at https://www.fortinet.com/content/dam/fortinet/assets/white-papers/FortiADC-ABCs.pdf, 2014, 8 pages.
U.S. Appl. No. 15/143,240, Notice of Allowance dated May 24, 2018, 15 pages.
U.S. Appl. No. 15/331,211, Non Final Office Action dated Jun. 6, 2018, 26 pages.
U.S. Appl. No. 14/814,209, Non-Final Office Action dated May 14, 2018, 20 pages.
U.S. Appl. No. 15/372,342, Notice of Allowance dated Mar. 13, 2018, 12 pages.
U.S. Appl. No. 15/782,700, Non-Final Office Action dated Jan. 26, 2018, 7 pages.
Nagalakshmi et al., Confident Multi-Factor Authentication on Web Application Via Captcha Technologies, International Journal of Computer Engineering in Research Trends, vol. 2, Issue 8, Aug. 2015, pp. 516-522.
U.S. Appl. No. 15/331,211, Final Office Action dated Oct. 16, 2018, 34 pages.
U.S. Appl. No. 15/707,261, Non-Final Office Action dated Sep. 13, 2018, 10 pages.
U.S. Appl. No. 15/331,211, Notice of Allowance dated Aug. 15, 2019, 22 pages.
U.S. Appl. No. 15/331,613, Notice of Allowance dated Aug. 21, 2019, 12 pages.
U.S. Appl. No. 15/782,700, Notice of Allowance dated Aug. 8, 2018, 13 pages.
U.S. Appl. No. 15/784,029, Non-Final Office Action dated Aug. 22, 2019, 14 pages.
U.S. Appl. No. 16/140,343, Non-Final Office Action dated Aug. 7, 2019, 11 pages.
Izumi et al., Toward Practical Use of Virtual Smartphone, IEEE 9th Asia-Pacific Symposium on Information and Telecommunication Technologies (APSITT), Dec. 12, 2012, pp. 1-5.
Menasce et al., Resource Management Policies for E-commerce Servers, ACM Sigmetrics Performance Evaluation Review, vol. 27, No. 4, Mar. 2000, pp. 27-35.
Heo et al., "Statistical SIP Traffic Modeling and Analysis System", IEEE, 2010, pp. 1223-1228.
Maruyama et al., "Dynamic Route Selection Algorithms for Session Based Communication Networks", ACM, 1983, pp. 162-169.
U.S. Appl. No. 15/291,804, First Action Interview Pilot Program Pre-Interview Communication dated Jan. 11, 2019, 4 pages.
U.S. Appl. No. 15/291,804, First Action Interview Office Action Summary dated Jun. 17, 2019, 5 pages.
U.S. Appl. No. 15/331,613, First Action Interview Office Action Summary dated May 29, 2019, 7 pages.
U.S. Appl. No. 15/331,613, First Action Interview Pilot Program Pre-Interview Communication dated Jan. 4, 2019, 5 pages.
U.S. Appl. No. 15/331,613, Notice of Allowance dated Jul. 9, 2019, 19 pages.
U.S. Appl. No. 15/707,261, Final Office Action dated Mar. 8, 2019, 6 pages.
U.S. Appl. No. 15/707,261, Notice of Allowance dated Jun. 27, 2019, 5 pages.
U.S. Appl. No. 15/331,211, Advisory Action dated Feb. 4, 2019, 5 pages.
U.S. Appl. No. 15/356,384, First Action Interview Pilot Program Pre-Interview Communication dated Feb. 8, 2019, 5 pages.
U.S. Appl. No. 15/356,384, Notice of Allowance dated Jun. 12, 2019, 9 pages.
U.S. Appl. No. 15/291,804, Notice of Allowance dated Oct. 22, 2019, 12 pages.
U.S. Appl. No. 15/356,384, Notice of Allowance dated Oct. 30, 2019, 8 pages.
U.S. Appl. No. 15/707,261, Notice of Allowance dated Oct. 11, 2019, 5 pages.
U.S. Appl. No. 15/987,631, Non-Final Office Action dated Mar. 3, 2020, 12 pages.
U.S. Appl. No. 16/140,343, Notice of Allowance dated Feb. 7, 2020, 8 pages.
U.S. Appl. No. 15/784,029, Final Office Action dated Mar. 5, 2020, 26 pages.

* cited by examiner

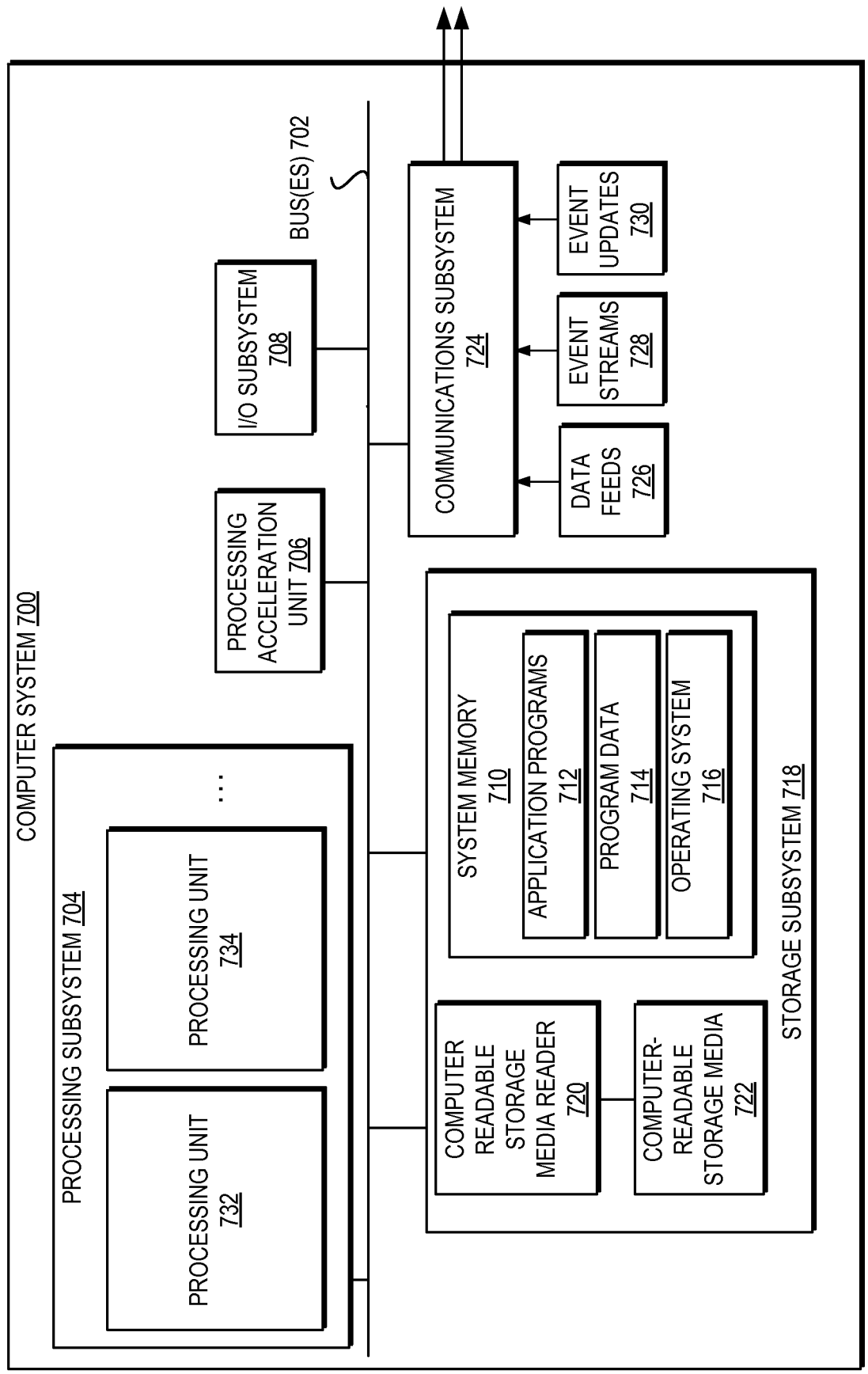

RESTRICTING ACCESS FOR A SINGLE SIGN-ON (SSO) SESSION

BACKGROUND

Generally, the present application relates to data processing. More specifically, the application is related to restricting access to resources accessible in a single sign-on (SSO) session.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

In an enterprise, users (e.g., employees) typically may have access to one or more different systems and applications. Each of these systems and applications may utilize different access control policies and require different credentials (e.g., user names and passwords). SSO can provide a user with access to multiple systems and applications after an initial login. For example, when the user logs-in to their work computer, the user can then also have access to one or more other resources, such as systems and applications.

In a situation where a user uses SSO to access resources from a shared computer, the user may want SSO access to a particular application only so as to prevent access to other resources accessible to that user for a SSO session. In other words, the user may not prefer to grant access to other resources besides a resource the user intends on accessing at that time. A first user may be concerned that a second user that uses the shared computer may access one or more of the resources accessible to the first user if a SSO session for the first user is active. Access management solutions may be challenged to provide users with the ability to configure access for a SSO session to restrict access to some of the resources accessible for the SSO session. Specifically, access management solutions are unable to allow users to choose at runtime the resources to which access is restricted for a SSO session.

Some access management solutions have been implemented to restrict access to some resources of the resources accessible to a user for a SSO session. For example, a session (e.g., an authentication session) is created to limit access to a specific resource the user is interested in accessing. However, such a solution depends on configuration of a specific authentication session. In another example, access to a specific resource may be configured for a lower authentication level that is permissible for users of a shared computer such that only those resources accessible to those users may be accessed. A resource would have to be designated ahead of time for restricting access. Such a solution may be unable to consider the access of different users that may potentially use a shared computer. Thus, the solutions in either of the examples do not enable a SSO session to be defined dynamically at runtime such that access to selected resources may be restricted.

New techniques are desired for enabling a user to dynamically (e.g., at run-time) select resources for which access is to be restricted for a single SSO session.

BRIEF SUMMARY

The present disclosure relates generally to providing single sign-on (SSO) access. Certain techniques are disclosed for restricting access to resources (e.g., an application, web content, or a computing resource) accessible in a SSO session. An access management system may manage access to one or more resources by implementing an SSO system. The SSO system may provide an SSO session that enables an authenticated user to access protected resources to which the user is entitled to access. In some instances, a user sharing a computer with other users may want to access a particular protected resource so as to restrict other users sharing the computer from accessing other protected resources accessible to the user in an SSO session. The access management system may enable the user to dynamically choose, such as during login, the protected resources which to restrict and/or permit. Upon successful authentication, a session may be established for only those protected resources that are permitted based on the user's selection, while the other resources are restricted.

In some embodiments, a user may be presented with a user interface during login to choose protected resources to restrict and/or to permit. The list of resources that can be chosen may include the protected resources which are accessible to the user upon successful authentication of credential information (e.g., userId and password) for the user. Resources may include an application (e.g., a web application) and/or resources provided by the application. For an application that is restricted, the resources provided by the application may also be restricted. The selected resources may be sent with the credential information to the access management system for authentication of the user. Upon successful authentication of the user, a session may be established in which information is stored indicating those resources to which access will be denied. The restricted access to resources may be configured for each session, so that a user can dynamically determine a scope of authentication for access when the user desires to establish a session.

By providing a user with control to configure resources at run-time (e.g., during login), the user can dynamically prevent access to resources that may otherwise be comprised to unauthorized users sharing a computer. With the ability to restrict access to resources during run-time, pre-configuration of a session with limited access is no longer needed. In an enterprise organization having thousands of users, each having their own session, enabling a user to restrict access to a set of resources at run-time reduces use of computing and human resources for manual and customized configuration in advance of providing credential information. Enabling a user to restrict access to resources provides a user with greater control over access such that the user can determine at run-time the resources to restrict or permit depending on the users who may be accessing a client for the SSO session. The capability to configure access to resources when providing SSO credential information further improves access security by preventing other users from gaining access to sensitive resources and/or applications.

In some embodiments, restricting access for a SSO session may be implemented by a computing system. The computing system may be part of an access management system. The computing system may be configured to implement methods and operations described herein. Yet other embodiments relate to systems and machine-readable tangible storage media which employ or store instructions for methods and operations described herein.

In at least one embodiment, a method may include receiving, from a client device operated by a user, credential data for the user. The user can be provided at the client device with access to a plurality of resources upon successful authentication of the credential data. The method may include receiving scope information for configuring the access to the plurality of resources. The method may include determining, based on the scope of information, a scope of authentication for the user to access the plurality of resources. The scope of authentication may indicate a set of resources of the plurality of resources for which the user is denied access at the client device. The method may include establishing a session for the user based on successful authentication of the credential data. The method may include configuring the session for the user based on the scope of authentication. The session may be configured such that the user is denied access to the set of resources.

In some embodiments, scope information is based on input received from the user at the client device. In at least one embodiment, scope information indicates a set of restricted resources for which the user is denied access at the client device. Determining the scope of authentication may include identifying the set of resources based on the set of restricted resources. The set of restricted resources includes a first resource corresponding to a first application and a second resource corresponding to a resource provided by a second application. Yet in some embodiments, scope of information indicates a set of permitted resources for which the user is permitted access at the client device. Determining the scope of authentication may include using the set of permitted resources to identify a set of restricted resources to be included in the set of resources. Each of the set of restricted resources can be identified as a resource that is in the plurality of resources and that is not included in the set of permitted resources.

In some embodiments, the method may include receiving, from the client device, a request to access a resource of the plurality of resources, and sending, to the client device, a request for credential information to determine authentication of user to access the plurality of resources. The request may be sent to the client device upon determining that a session has not been created for the user to access the resource at the client device. The credential data may be received in response to the request for credential information.

In some embodiments, the method may include, upon configuring the session for the user, receiving, from the client device, a request to access a resource of the plurality of resources. the method may include determining that the resource is included in the set of resources for which the user is denied access at the client device and based on determining that the resource is included in the set of resources, denying access to the resource at the client device.

In some embodiments, the method may include, upon configuring the session for the user, receiving, from the client device, a request to access a resource of the plurality of resources. Access to the resource may be requested in an application. The method may include determining that the application is included in the set of resources for which the user is denied access at the client device and based on determining that the application is included in the set of resources, denying access to the resource at the client device.

In some embodiments, the method may include, upon configuring the session for the user, receiving, from the client device, a request to access a resource of the plurality of resources. The method may include determining whether the resource is included in the set of resources for which the user is denied access at the client device. The method may include based on determining that the resource is included in the set of resources, denying access to the resource at the client device, and based on determining that the resource is not included in the set of resources, permitting access to the resource at the client device.

In some embodiments, a set of resources includes a first resource corresponding to a first application and a second resource corresponding to a resource provided by a second application. In at least one embodiment, a set of resources includes one or more applications, and an application is one of a web application or an enterprise application. In at least one embodiment, a plurality of resources includes at least one application and at least one resource provided by an application. In at least one embodiment, a set of resources includes a resource identified by a uniform resource identifier (URI).

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 illustrates an exemplary computer system that may be used to implement an embodiment of the present invention.

DETAILED DESCRIPTION

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing single sign-on (SSO) access. A SSO session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

Certain techniques are disclosed for restricting access to resources accessible in a SSO session. In some instances, once a SSO session is established for a user at a computer, another user sharing the same computer may be able to access all of the resources accessible through the SSO session. As such it may be desirable for a user authenticated for the SSO session to restrict access to certain resources during the SSO session to prevent other unauthorized or unknown users from accessing all of the resources accessible to the user when authenticated for a SSO session. By doing so, the user of the authenticated SSO session can selectively prevent access to resources provided by an SSO session to be comprised to other users. In an enterprise organization having thousands of users, each having their own session, enabling a user to restrict access to a set of resources at run-time reduces manual configuration of individual access to restrict access. Further, a user is provided with greater control over SSO access such that the user, when providing credential information, can select the resources to restrict or permit depending on the users who may be accessing a client for the SSO session. The capability to configure access to resources when providing credential information provides greater security for access management by preventing other users from gaining access to sensitive resources and/or applications on a shared computer.

Figure 1:
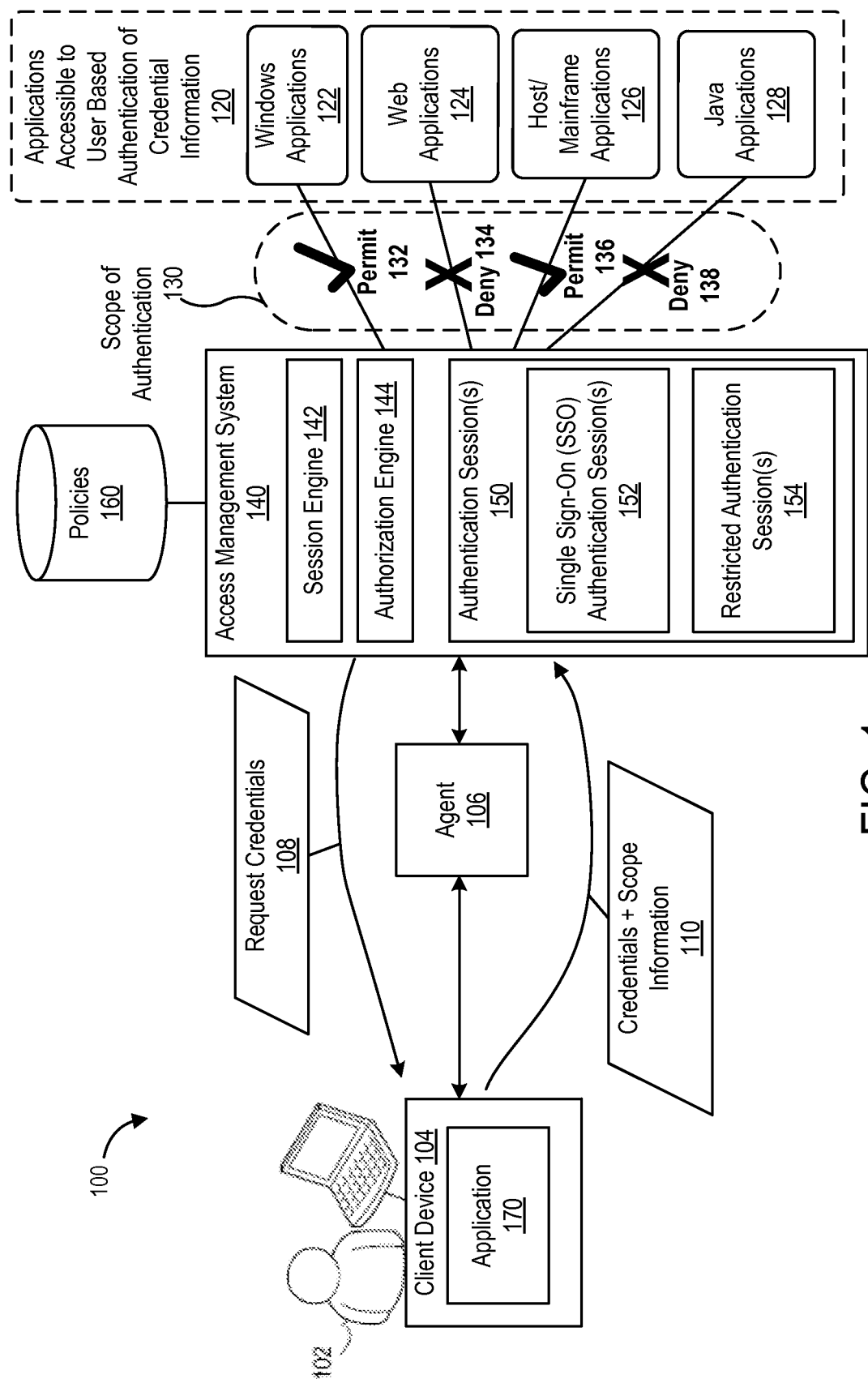
FIG. 1 illustrates a high-level diagram of a system for restricting access for a single sign-on (SSO) session in accordance with an embodiment.

Some embodiments, such as systems, methods, and machine-readable media are disclosed for restricting access to resources accessible in a SSO session. FIG. 1 illustrates a system 100 in which a user (e.g., user 102) with access to resources accessible in a SSO session can restrict access to all or some of those resources in accordance with an embodiment. System 100 includes an access management system 140. Access management system 140 may provide access one or more resources. Access management system 140 may implement a sign-on system, e.g., a SSO system, which can establish an SSO session to provide SSO access to one or more resources. For purposes of illustration, "session" as described herein includes an SSO session; however, a session may include other types of sessions.

Resources may include a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 102 in a SSO system.

User 102 operating a client device, e.g., client device 104, may provide input at client device to restrict access to some or all of resources accessible to user 102 upon authentication of user 102. The input may indicate a scope of authentication for a session. Based on the scope of authentication, access management system 140 can determine the protected resources for which access is restricted, and permit access to those protected resources for which access is not restricted.

FIG. 1 show an example in which user 102 can restrict access to one or more resources when providing credential information for authentication of user 102. In this example, user 102 operating client device 104 may attempt to access an application, e.g., application 170. Application 170 may be any one of applications 120 accessible to user 102 upon successful authentication of credential information for user 102. Client device 104 may send a request to a resource server to obtain access to application 170 provided by the resource server. Before application 170 is provided to client device 104 for user 102, user 102 may be authenticated for a session that provides user 102 with access to application 170. Authentication may include determining whether user's 102 credential information provided at device 104 is valid.

Requests from client device 104 can be received through a gateway system. The gateway system may support SSO services. For example, an SSO gateway may implement one or more access agents, such as agent 106 (e.g., web gate agent), to balance and/or handle requests from clients. In the example shown in FIG. 1, agent 106 may intercept user requests for one or more resources protected by it. Agent 106 may determine whether user 102 is authenticated to access a requested resource (e.g., application 170). Agent 106 may determine whether session information is stored for an existing session for user 102. Agent 106 may contact access management system 140 to determine whether user 102 has a valid SSO session for client device 104 to access application 170.

Access management system 140 may verify whether a requested resource, e.g., application 170, is a protected resource that requires credentials for access. Upon determining that access determines that the resource is not protected, agent 106 may grant the user with access to the resource. If the resource is protected, access management system 140 may communicate information to agent 106 indicating that access to the resource is protected. Access management system 140 may request 108 credential information from client device 104. Request 108 to client device 104 may be facilitated through agent 106. User 102 may be challenged at client device 104 to provide credential information for authentication of user 102.

Resources (e.g., applications 120) may be accessible to user 102 based on successful authentication of credential information. User 102 can login at a client, e.g., client device 104 to provide credential information to client device 104. Client device 104 may present one or more interfaces (e.g., a SSO user interface) that support SSO services. Client device 104 may store credential information, such as an authentication cookie (e.g., within a browser application) on client device 104. Client device 104 can send the authentication cookie to access management system 140 or may include the authentication cookie with requests to access management system 140.

To restrict access to one or more protected resources, user 102 can operate client device 104 to provide input at an SSO user interface. The input may be used to determine a scope of authentication for accessing protected resources. For example, the input may include information ("scope information") indicating one or more of the protected resources (e.g., applications 120) for which access is permitted or restricted by user 102 at client device 104. Protected resources may be those that are accessible to user 102 upon successful authentication of user's 102 credentials. The scope of authentication may indicate the protected resources for which access is to be restricted or permitted. The scope of authentication may be restricted to a session upon successful authentication of credential information.

Client device 104 may communicate 110 with access management system 140 to determine authentication for a session based on user's 102 credentials. Client device 104 may send credentials information and scope information to access management system 140. The scope information may correspond or may be based on input received from user 102 at client device 104. Credential information and/or scope information may be sent in a single communication or multiple communications from client device 104 to access management system 140. In some embodiments, communication 110 may be facilitated through one or more agents, such as agent 106. The scope information may be sent to access management system 140 to determine the resource(s) for which access is restricted and/or permitted. In at least one embodiment, the scope information may be sent 110 with credential information provided to access management system 140.

Access management system 140 may determine authentication of user 102 based on authentication of the credential information. Authenticating the credential information may include performing validation of the credential information to determine whether it matches previously stored credential information supplied by user 102. Upon successful authentication of credential information to authenticate user 102, access management system 140 may establish a session (e.g., an authentication session) for user 102. Once credential information for user 102 is authenticated, an authentication session may provide access to protected resources accessible to user 102. As further described below, access to some protected resources may be restricted based on a scope of authentication determined by access management system 140 based on scope information received from client device 104.

In the example shown in FIG. 1, access management system may establish an authentication session for user 102 based on communication 110 between client device 104 and access management system 140. In this example, access management system 140 may establish the authentication session based on authentication of credential information for user 102. Once logged in, user 102 may access resources to which the user is authorized to access, such as running different applications, accessing cloud storage, or the like.

Based on scope information, access management system 140 may determine a scope of authentication 130, which restricts access to one or more protected resources (e.g., applications 120). The authentication session may be restricted (e.g., restricted authentication session) based on scope of authentication 130. In one example shown in FIG. 1, access to applications 120 may be restricted in scope of authentication 130 such that access is permitted 132 to windows applications 122, access is permitted 136 to host/mainframe applications 126, access is denied 134 to web applications, and access is denied 138 to Java applications. By enabling a user to provide input to indicate a scope of authentication, a user can selectively control access to resources including the resources provided by an application. Doing so can prevent other users who may operate client device 104 from accessing all the resources accessible to user 102 during a session.

Access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 120 may perform authentication of a user (e.g., user 102) operating a client device (e.g., client device 104). Authentication is a process by which a user verified to determine that he/she is who he/she claims to be.

In some embodiments, access management system 140 may use one or more policies 160 to control access to resources. Policies 160 may include an authentication policy that specifies the authentication methodology to be used for authenticating the user for whom the access must be provided on a given resource. Policies 160 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 160.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Figure 2:
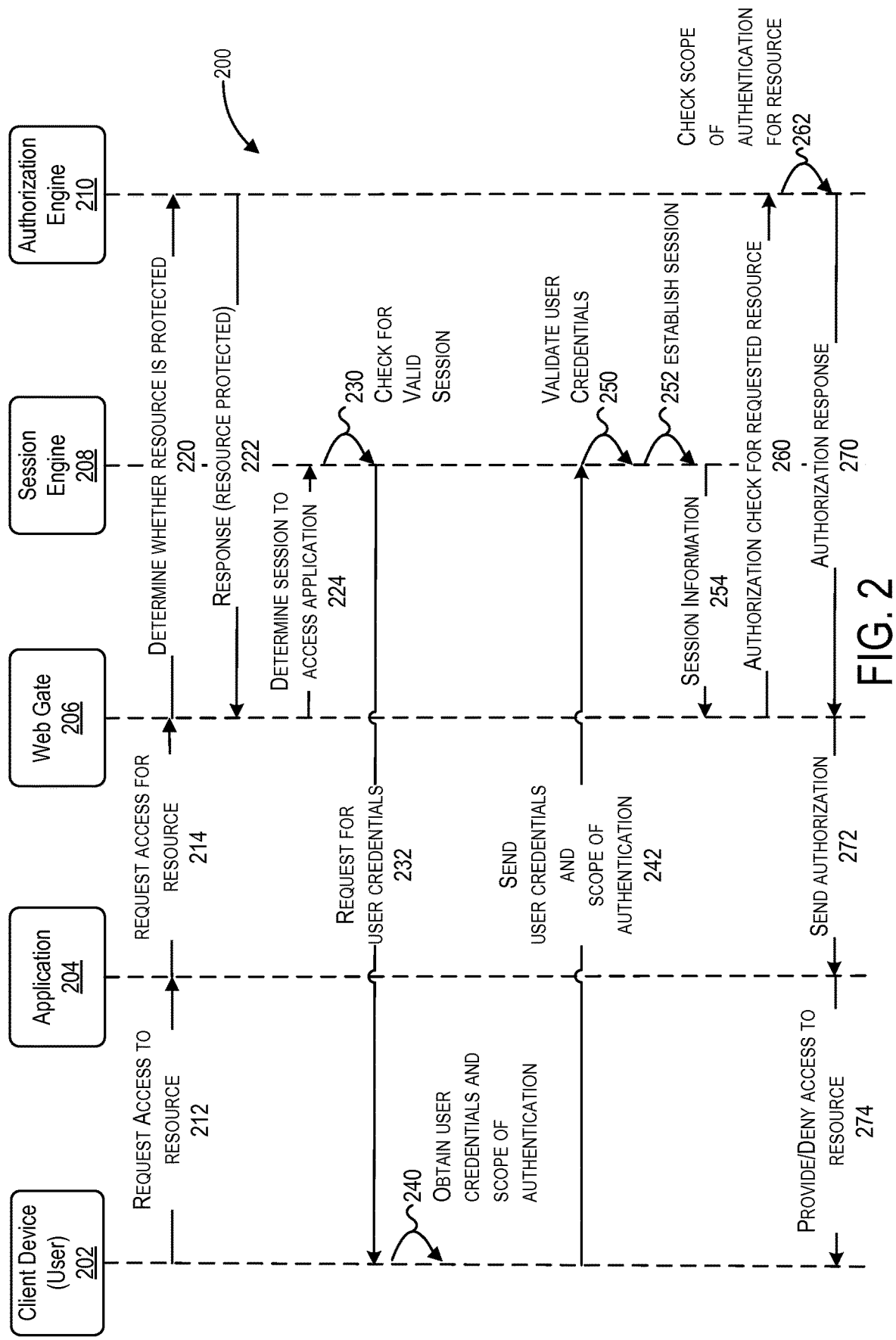
FIG. 2 illustrates a sequence diagram showing operations for restricting access for a SSO session in accordance with an embodiment.
Figure 3:
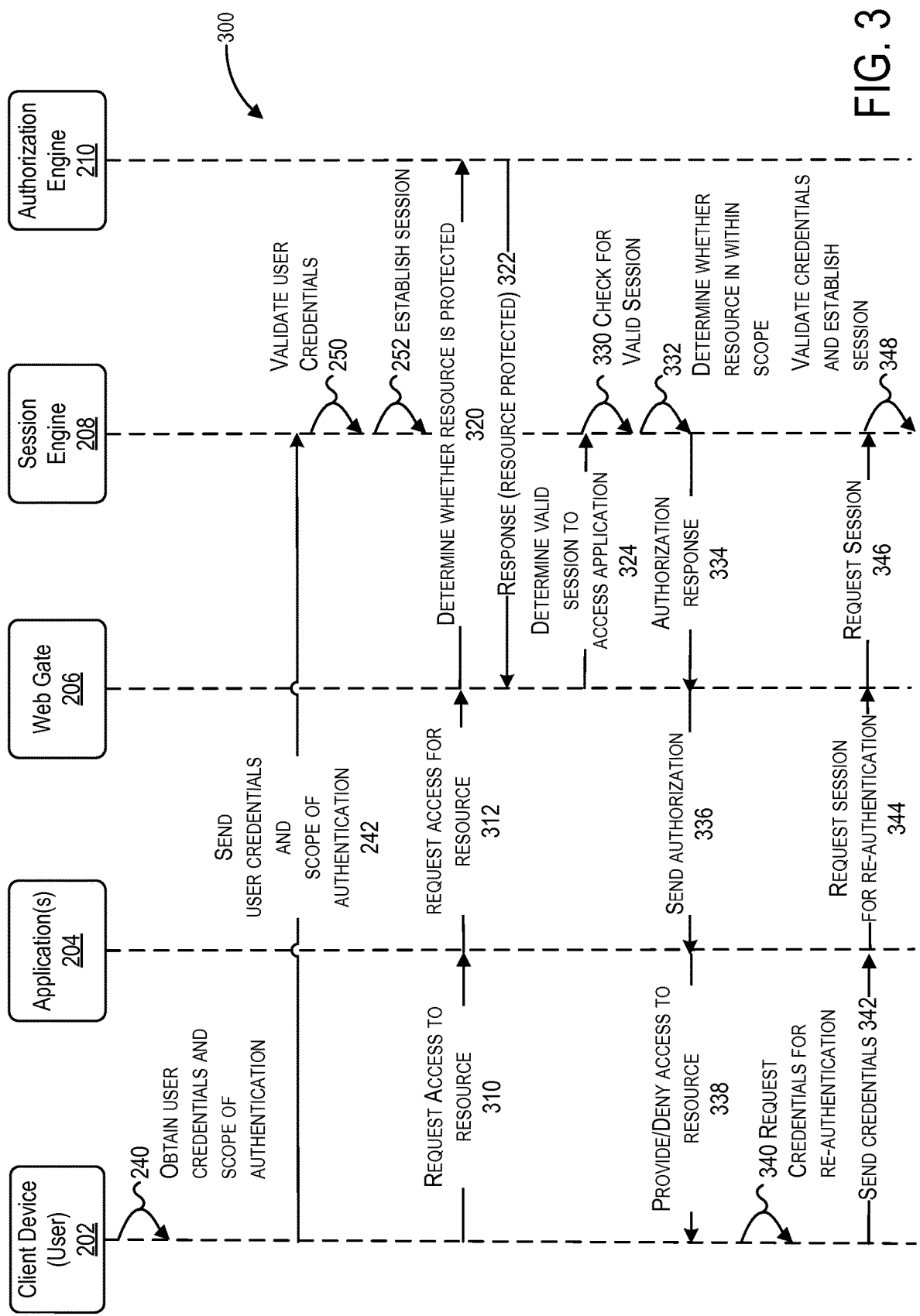
FIG. 3 illustrates a sequence diagram showing operations for restricting access for a SSO session in accordance with an embodiment.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142 and authentication engine 144, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). FIGS. 2 and 3 further describe functionality of session engine 142 and authorization engine 144. Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as policies 160 and session data (e.g., authentication sessions 150) for one or more users, e.g., user 102. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource. Session engine 142 checks for a valid session for user 102 to access a requested resource that is protected. Session engine 142 may assess validity of a session for user 102 based on consideration of one or more access policies applicable to user 102. Based on determining that a valid session does not exist for user 102, session engine 102 may request 108 credential information ("credentials") from user 102. Successful authentication of the credential information may provide the user with access to one or more resources, which may include a requested resource.

Request 108 may be communicated to client device 104, which in response, prompts user 102 for user credentials to determine authentication of a session. Request may include information (e.g., a URL) to a web page or a user interface (e.g., a web page, portal, or dashboard) to receive credential information. Request 108 may be communicated to client device 104, which in response, prompts user 102 for user credentials to determine authentication of a session.

Session engine 142 may perform operations to authenticate credential information for user 102. In one example, a session may be established for a scope of authentication determined based on the scope information. The scope information may indicate the resources permitted and/or restricted for the session. The session may be established as a single session for which access is restricted based on the scope of authentication that is determined.

In some embodiments, session engine 142 may store information about sessions (e.g., authenticated session 150) established upon successful authentication of a user. For a SSO session (e.g., SSO authenticated sessions) in which there is no restricted access, the SSO session may be managed as a SSO session enabling access to all resources accessible to user based upon successful authentication of credential information for a user. Session information may be stored for authentication sessions 150. For example, session engine 142 may store session information for authentication sessions ("SSO authentication sessions") and may store session information for restricted authentication sessions 154 for which access is restricted for some resources.

In some embodiments, session engine 142 may communicate with authorization engine 144 regarding the scope of authentication. Session engine 142 can send the scope information received from client device 104 to authorization engine 144. Authorization engine 210 can determine resources that are protected and based on authentication sessions 150, can determine resources that are permitted and/or restricted for a session. In some embodiments, authorization engine 144 may determine whether a session has a scope of authentication that restricts access to user 102 for some resources. Authorization engine 144 may determine whether the scope of authentication is restricted based on stored information about authentication sessions 150.

In some embodiments, access management system 140 may be implemented in system 100 according to an agent-server model for communication between client device 104 and any one of access manager servers implemented for access management system 140. The agent-server model may include an agent component (e.g., a gateway system) and a server compontent. The agent component may be deployed on a host system and the server component may be deployed on a server, e.g., an access manager server. User 102 operating client device 104 may communicate with access management system 140 via agent 106 using an enterprise computer network. Client device 104 may be a workstation, personal computer (PC), laptop computer, smart phone, wearable computer, or other networked electronic device.

Agent 106 may provide access control and may operate to protect access management system 140 and any resources accessible through access management system 140 against external and internal web-based threats. Access management system 140 may communicate with one or more resource computing systems (e.g., resource servers) that provide access to one or more resources, e.g., applications 120. Agent 106 may implement or operate as the agent component access management system 140 and may include a server that operates as the server component. Each resource accessible by access management system 140 may be protected through an agent, e.g., agent 106. Agent 106 may intercept user requests for one or more resources protected by it and check for user credentials in order to authenticate the user. The agent may then contact a server, e.g., an access manager server at access management system 140. The access management server may verify whether a resource is a protected resource that requires credentials for access. If the access management server determines that the resource is not protected, agent 106 may grant access to user 102. If the resource is protected, agent 106 may request user 102 to provide authentication credentials.

In some embodiments, communication between agent 106 and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM_ID token), which serves the SSO requests that are being propagated over HTTP. A second token is an authorization token (e.g., OAMAuthn Token) that may be used to server the SSO requests that are being propagated over OAP. The browser tokens may be stored as host cookies at client device 104.

Access management system 140 (e.g., using agent 106) may present user 102 with a request for authentication credentials in the form of a challenge (e.g., via the user's web browser at client device 104). In some embodiments, user 102 can access SSO user interface through a client executing on client device 104 or through a web browser on client device 104. The SSO user interface may be implemented at access management system 140. Access management system 140 may send, with request 108, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from client device 104 to access management system 140 to determine a policy type for the application from one or more policies 160 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent 106 can enable users to access applications 120 using SSO services provided by access management system. Access may be provided through a web browser directly, without first accessing the SSO user interface or using a client executing on client device 104. If user 102 is not authorized, then access management system may request 108 credentials from user 102. The SSO user interface may present an interface to receive input including credential information. The credential information may be sent 110 to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

In some embodiments, the SSO user interface that receives input for providing authentication credentials may include one or more interactive elements to receive information ("scope information"). The scope information may indicate or may be used to determine a scope of authentication, e.g., the protected resources for which access is to be permitted or restricted, for a session. The SSO user interface may indicate all protected resources (e.g., applications and URIs) for which access is protected. The SSO user interface may include one or more interactive elements to select the protected resources to be restricted and/or permitted within a scope of authentication (e.g., a valid SSO session). The SSO user interface may present the protected resources accessible to user 102 upon successful authentication of user's 102 credentials or along with interactive elements to receive. For those resources accessible using an application, the SSO user interface may provide interactive elements to enable selection of the resources accessible to user 102 for an application. The interactive elements may be presented in the SSO user interface with the interactive elements to receive authentication credentials. For example, the information may indicate resources for which access is permitted, and based on such information, a determination can be made as to which resources are restricted.

The input received through the SSO user interface may indicate that all or a subset of the protected resources are to be restricted for access or may indicate the protected resources for which access is to be permitted. Based on those resources permitted, the resources for which access is restricted can be determined. Client device 104 may send scope information with credential information in a communication to access management system 140. The scope information may correspond to the input indicating the protected resources that are to be permitted and/or restricted.

FIG. 2 illustrates a sequence diagram 200 showing operations for restricting access for a session (e.g., a SSO session). Specifically, diagram 200 shows that a user of client device 202 may restrict access to one or more resources when providing credentials for authentication of the user for a SSO session. The resource(s) for which access is restricted may be a subset of the resources accessible to a user for a SSO session. Starting at 212, a user ("USER1") operates client device 202 to request a resource ("requested resource") for which access is managed by an access management system, e.g., access management system 140. As explained above, a resource may be an application or a resource accessible using an application, e.g., application 204. In the example of FIG. 2, client device 202 may be operated to request access to a resource through application 204.

Requests to access a resource may be handled by an agent, e.g., Web Gate 206. An agent may protect access to a resource provided by a server. Web Gate 206 may communicate with one or more agent endpoints. For example, Web Gate 206 may communicate with a session engine of an access management system to perform authentication for USER1 on client device 202 to establish a session for USER1. Session engine 208 may be implemented on a server (e.g., authentication server) of the access management system. For example, session engine 208 may include or implement session engine 142. Web Gate 206 may communicate with an authorization engine 210 of the access management system to perform authorization for access to a resource. Authorization engine 210 may be implemented on a server (e.g., an authorization server) of the access management system. Authorization engine 210 may control authorization to access one or more resources. For example, authorization engine 210 may include or implement authorization engine 144.

Web Gate 206 may intercept user requests for one or more resources protected by it to determine access to a requested resource. Web Gate 206 may check for user credentials in order to authenticate the USER1 for a session to access to those resources controlled by the access management system. At 214, Web Gate 206 may intercept a request for access to a resource. Web Gate 206 may determine whether the resource is protected and if so, whether an active session exists to enable access to the resource from client device 202 via application 204.

Web Gate 206 may determine whether a session is active to access a requested resource. For example, Web Gate 206 may determine that an SSO session is active to provide access to resources including the requested resource. In some embodiments, Web Gate 206 may determine whether a requested resource is protected, such that authentication is required to access the resource. If authentication is required, then Web Gate 206 may determine whether a session is active and if not, proceeds to determine authentication of USER1 to access the requested resource.

In at least one embodiment, Web Gate 206 may determine 220 whether a requested resource is protected. Web Gate 206 may communicate with authorization engine 210 to determine whether a resource is protected. In some instances, a resource may be protected for some users and may not be protected for other users depending on access granted to each user. At 222, authorization engine 210 may send a response 222 indicating whether a requested resource is protected. Response 222 may include other information related to access for the requested resource.

Based on determining that access to a requested resource is protected, Web Gate 206 may communicate 224 with session engine 208 to determine whether a valid session exists for USER1 to access the requested resource. For example, Web Gate 206 may send an authentication request to session engine 208. At 230, session engine 208 may check for a valid session for USER1 to access the requested resource that is protected. Session engine 208 may assess validity of a session for USER1 based on consideration of one or more access policies applicable to USER1.

Once it is determined that USER1 does not have a valid session for a resource, session engine 208 may request 232 user credential information ("credentials") from USER1. Successful authentication of the credential information may provide the user with access to one or more resources, which may include the requested resource. Request 232 may be communicated to client device 202, which in response, prompts USER1 for user credentials to determine authentication of a session. Request 232 may include information (e.g., a URL) to a web page provided by session engine 208 to obtain credential information. The web page may be displayed in application 204 or some other interface at client device 202. In some embodiments, request 232 may include resource information identifying one or more resources accessible to USER1 for a session upon successful authentication of the credential information.

At 240, client device 202 may display an interface (e.g., a web page or an interface within an application) to challenge USER1 for credential information. Client device 202 may display an interface to enable USER1 to provide input to indicate a scope of authentication for a session established using the credential information. In some embodiments, the interface may include one or more interactive elements to enable USER1 to indicate a scope of authentication. The interactive element(s) may enable a user to choose or input one or more resources that are accessible to USER1 for a session upon successful authentication of the credential information. The one or more resources may be determined based on resource information included in request 232. The interface may enable a user to select one or more of the resources or types of resources accessible to the user for permitting or restricting access for a session.

Client device 202 may send 242 the input received at 240 to session engine 208. The input may include credential information and scope information to indicate a scope of authentication. The scope information may include the resource(s) permitted and/or restricted for a session. In some embodiments, the scope information may indicate a type of resource to be permitted or restricted for access in a session. As described further below, the scope information may be processed by session engine 208 to determine the resource(s) restricted for a session.

Session engine 208 may perform operations 250 to authenticate credential information for USER1. Operations 252 may be performed by session engine 208 to establish a session based upon successful authentication of USER1 using the credential information. In this example, the session may be established for a scope of authentication determined based on the scope information received from client device 202. The scope information may indicate the resources permitted and/or restricted for the session. The session may be established as a single session for which access is restricted based on the scope of authentication that is determined.

Based on the scope information, a scope of authentication for establishing the session can be determined. The resource(s) restricted for access to a session may be determined based on the scope information, which indicates the resources restricted. Alternatively, the resources restricted may include those that are not included as being permitted for the resources protected from USER1. In some embodiments, the resources restricted may be determined based on the type of resources identified by the scope information. The resources that are restricted can be determined based on the resources having the type of resource that is permitted or restricted as indicated by the scope information.

Session engine 208 can determine the scope of authentication. Session engine 208 may store session information. Session information may be used to determine that resources that are permitted and/or restricted. For example, the session information may be stored to indicate the resources that are restricted, or alternatively the resources that are permitted, in which case resources that are not permitted can be determined.

In some embodiments, session engine 208 may communicate with authorization engine 210 regarding the scope of authentication. Session engine 208 can send the scope information received from client device 202 to authorization engine 210. As described above, authorization engine 210 can determine the resources that are permitted and/or restricted for a session based on the scope information. Alternatively, session engine 208 may send session information about the determined scope of authentication to authorization engine 210. Authorization engine 210 can store and use the scope of authentication to determine requests to access resources.

Once a session is established, session engine 208 may send 254 session information (e.g., a token) to Web Gate 206 enabling access to the session established at 252. Web Gate 206 may then determine whether USER1 at client device 202 is authorized to access a requested resource upon establishment of a session. At 260, Web Gate 206 may communicate with authorization engine 210 to check authorization for USER1 to access the requested resource (e.g., the resource requested at 212) in the session established at 252.

At 262, authorization engine 210 may assess the scope of authentication for a session established at 252. In some embodiments, authorization engine 210 may determine whether the session has a scope of authentication that restricts access to USER1 for some resources. Authorization engine may determine whether the scope of authentication is restricted based on stored information about the scope of authentication for the session. If access is restricted, authorization engine 210 may determine whether a requested resource is within a set of restricted resources. In some embodiments, authorization engine 210 may communicate with session engine 208 to determine the scope of authentication for an established session.

Based on the assessment of the scope of authentication for a session, an authorization response can be sent 270 to Web Gate 206. The authorization response can be sent from authorization engine 210 or can be communicated to session engine 208, which then sends the authorization response to Web Gate 206. At 272, Web Gate 206 may assess the authorization response to determine access to a resource of a session. Based on the assessment, Web Gate 206 may send an authorization message to client device 202. In some embodiments, the authorization message may be received at client device 202 by application 204. In response to the authorization message, application 204 may determine whether to permit or deny access to a requested resource through application 204. If access is permitted, application 204 may provide the resource in application 204.

By enabling a user to specify at run-time resources for which access is restricted in a session, configuration of a session can be dynamically determined based on a user's preference at run-time. Thus, the user can more easily configure access to a session to restrict access to resources at a shared machine to prevent other users of that machine from accessing certain resources. The ability to configure access to resources at run-time further reduces processing performed by administrators to configure a session based on a user's need. Configuring resources when a user is providing credentials allows the user to control access to a session on a fine-grain level such that specific resources (e.g., URIs) can be restricted without having to restrict an entire application.

Now turning to FIG. 3, a sequence diagram 300 is illustrated for restricting access for a session (e.g., a SSO session). Specifically, diagram 300 shows processing performed to determine whether to restrict access to a resource requested in a session established with restrict access to resources. Some examples described with reference to FIG. 3 are based on examples described with reference to FIG. 2.

Referring to the examples described with reference to FIG. 2, operations 252 are performed to establish a session with restricted access to one or more resources. A session may be established with restricted access for a scope of authentication. The scope of authentication may be determined based on scope information received from client device 202. While a valid session established for restricted access to one or more resources is active, USER1 operating client device 202 may request access to a resource at 310. The resource may be the same or different from the one which initiated the creation of a session at 252. In any event, access to the resource at 310 may be requested through an application, e.g., application 204. In some embodiments, the requested resource may be an application, e.g., application 204. In at least one embodiment, application 204 may request 312 access for the resource requested at 310.

In some embodiments, an agent, e.g., Web Gate 206, may request access for a requested resource. The resource may have been requested by application 204 or client device 202. Upon intercepting a request for a resource, Web Gate 206 may determine 320 whether a requested resource is protected. A resource that is protected may require an active valid session enabling access to the resource. In some embodiments, Web Gate 206 may determine whether an active valid session exists before determining whether a resource is protected.

To determine whether a resource is protected, Web Gate 206 may request authorization engine 210 to indicate whether a resource requested at 310 is protected. Authorization engine 210 may communicate 322 a response indicating whether the resource is protected.

To determine whether an active valid session exists to access the requested resource, Web Gate 206 may request 324 session engine 208 to check for a valid session and to determine whether a requested resource is accessible in the valid session. Using session information for stored for valid sessions, session engine 208 may determine 330 whether a valid session exists for USER1. A valid session may exist when a session has been established based on successful authentication of credential information for a user. The session, if established, may be configured to restrict access to one or more resources if scope information was provided with the credential information.

Based on identifying a valid session, session engine 208 may determine, using session information for the valid session, whether the requested resource is within a scope of authentication (if indicated with the credential information). To determine whether a requested resource is within the scope of authentication, the requested resource may be compared to the resources for which access is restricted. The request for a resource may be denied to client device 202 based on determining that the requested resource matches a resource for which access is restricted. In some embodiments, when the requested resource is provided by an application that is included in the resources that are restricted, then all resources provided by the application including the requested resource may be restricted including the requested resource.

Session engine 208 may send an authorization response to client device 202. For example, session engine 208 may send authorization response 334 to Web gate 206. The authorization response may indicate whether a valid session exists, and if so, whether the requested resource is permitted for access or denied for access at client device 202. Upon determining that a valid session does exist, authorization response 334 may include the requested resource that is accessible within a scope of authentication. Upon determining that a valid session does not exist, authorization response 334 may include information indicating that a valid session does not exist for a user at client device 202. In some embodiments, the authorization response 334 may include a request for credential information to authenticate a user. Upon determining that a valid session does exist and that access to the requested resource is denied, authorization response 334 may indicate that access to the requested resource may be denied.

Web Gate 206 may process authorization response 334 to determine an action to perform in response to authorization response 334. Web Gate 206 may communicate 336 with client device 202 by sending authorization 336 to indicate the authorization based on authorization response 334. Authorization 336 may indicate whether a valid session exists, and if so, whether access from client device 202 to the requested resource is permitted.

In some embodiments where the requested resource is requested via an application, e.g., application 204, Web Gate 206 may send authorization 336 to application 204. Upon receiving communication 336 from Web Gate 206, application 204 may determine whether to permit or deny access to the requested resource. Application 204 may be configured to provide or deny access to the requested resource based on authorization 336. In some embodiments, application 204 may indicate to client device 202 that credential information is requested to authenticate (e.g., re-authenticate) a user at client device 202 that requested a resource.

Client device 202 may perform operations 340 in response to the authorization indicated by application 204. For example, client device 202 may prompt user to provide credential information to authenticate a user. In some embodiments, client device 202 may prompt use to provide input to indicate one or more resources to permit or deny within a scope of authentication. Client device 202 may send a request to Web Gate 206 with credential information. The request, e.g., request 342, may be made to application 204, which requests 344 authentication for a session. Web Gate 206 may request a session from session engine 208. Session engine 208 may authenticate 348 the credential information, and upon successful authentication of the credential information, session engine 208 may establish 348 a session.

Figure 4:
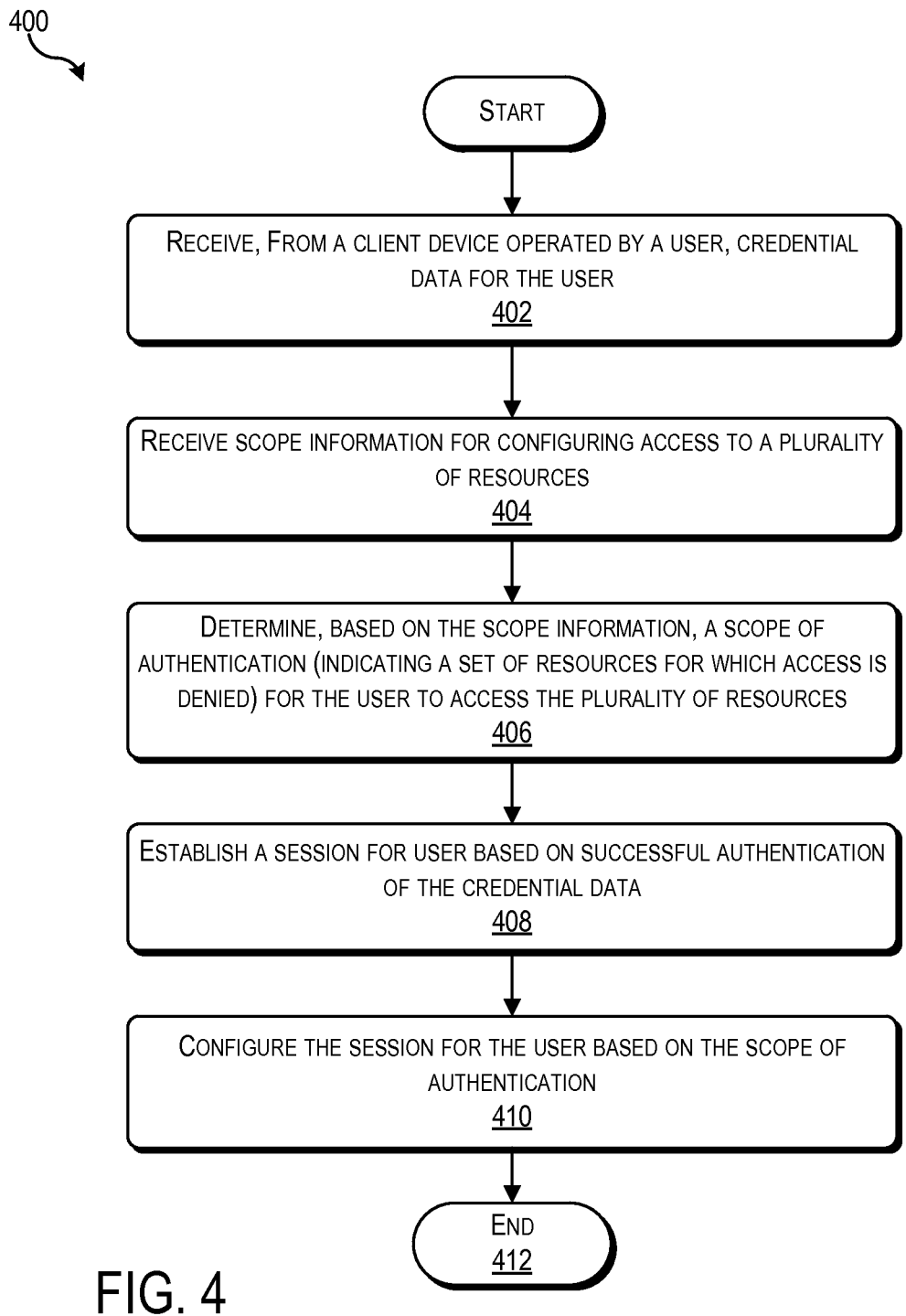
FIG. 4 depicts a flowchart illustrating a process for restricting access for a SSO session in accordance with an embodiment.

FIG. 4 illustrates a flowchart 400 a process for restricting access for a SSO session according to some embodiments of the present invention. In some embodiments, the process depicted in flowchart 400 may be implemented by access management system 140 of FIG. 1.

Flowchart 400 may begin at 402, by receiving, from a client device operated by a user, credential data for the user. The credential data may be received from client device, which operates in response to a requested for credential information from the user. Credential data may be received to authenticate a user based on determining that a session has not been created for the user to access a requested resource. A user is provided at the client device with access to a plurality of resources upon successful authentication of the credential data. As explained above, the plurality of resources may include applications and/or one or more resources provided by an application.

At 404, scope information for configuring access to the plurality of resources may be received. In some embodiments, scope information may be received with credential data for a user. The scope information may be based on input received from the user at the client device. The scope information may be received with credential information at the client device. The scope information may indicate a set of resources for determining a scope of authentication. The set of resources may include resources ("restricted resources") for which the user is to be denied access and/or may include resources ("permitted resources") for which the user is to be permitted access. The access for the set of resources is determined for the user based on successful authentication of the credential data for the user. Some or all of the set of resources may be included in the plurality of resources otherwise accessible to the user based upon successful authentication of the user. The set of resources may include applications and/or one or more resources provided by one or more applications.

At 406, based on the scope of information received, a scope of authentication may be determined for a user to access the plurality of resources. The scope of authentication may indicate a set of resources of the plurality of resources for which the user is denied access at the client device. In one example, when the scope of information indicates a set of permitted resources, the set of resources for the scope of authentication may be determined by using the set of permitted resources. The set of permitted resources may be used to identify a set of restricted resources to be included in the set of resources for the scope of authentication. In some embodiments, the set of resources indicated by scope information may include more resources than those included in the plurality of resources. Each of the plurality of resources not included in the set of permitted resources may be identified for the set of resources within the scope of authentication. In another example, when the scope of information indicates a set of restricted resources, the set of resources for the scope of authentication may be determined by identifying each restricted resource of the set of restricted resources that are included in the plurality of resources. Each restricted resource included in the plurality of resources may be identified for the set of resources within the scope of authentication.

A session for the user is established based on successful authentication of the credential data at 408. Establishing a session may include creating a session and storing information about the session that is created. Establishing a session may include performing authentication of the credential data to determine the credential data is successful authenticated.

At 410, an established session is configured for the user based on the scope of authentication. The session may be configured such that the user is denied access to the set of resources indicated by the scope of authentication. Configuring a session to deny access to the set of resources may include storing information for the session to indicate information about the set of resources for access is to be denied. In some embodiments of an access management system having multiple servers performing different functions, the scope of authentication may be communicated to a server that manages authorization for resources includes in the set of resources. As such, configuring the session may include sending information about the set of resources to one or more servers that manage access to the resources in the set of resources.

Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted by in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. While processing depicted in FIG. 4 is with respect to restricting access for a SSO session, such processing may be performed for multiple sessions, such that access can be restricted for each of the sessions. One of ordinary skill in the art would recognize many variations, modifications, and alternatives.

In some embodiments, additional steps may be added by which access to a resource is determined upon configuring a session for a user according to the processing steps depicted in FIG. 4. In one example, upon configuring a session for a user to restrict access to a set of resources, a request to access a resource ("requested resource") may be received from a client device. The requested resource may be one of a plurality of resources accessible to user upon successful authentication of credential information for the user. Based on the configuration of an established session, a determination is made as to whether the requested resource is included in the set of resources for which the user is denied access at the client device. Based on the determination that the requested resource is included in the set of resources, access to the requested resource is denied to the user at the client device. In another example, upon configuring a session for a user to restrict access to a set of resources, a request to access a resource may be received from a client device. The requested resource may be requested in an application. A determination is made as to whether the application is included in the set of resources for which the user is to be denied access at the client device during the session. Based on determining that the application is included in the set of resources, access to the requested resource in the application may be denied at the client device.

Figure 5:
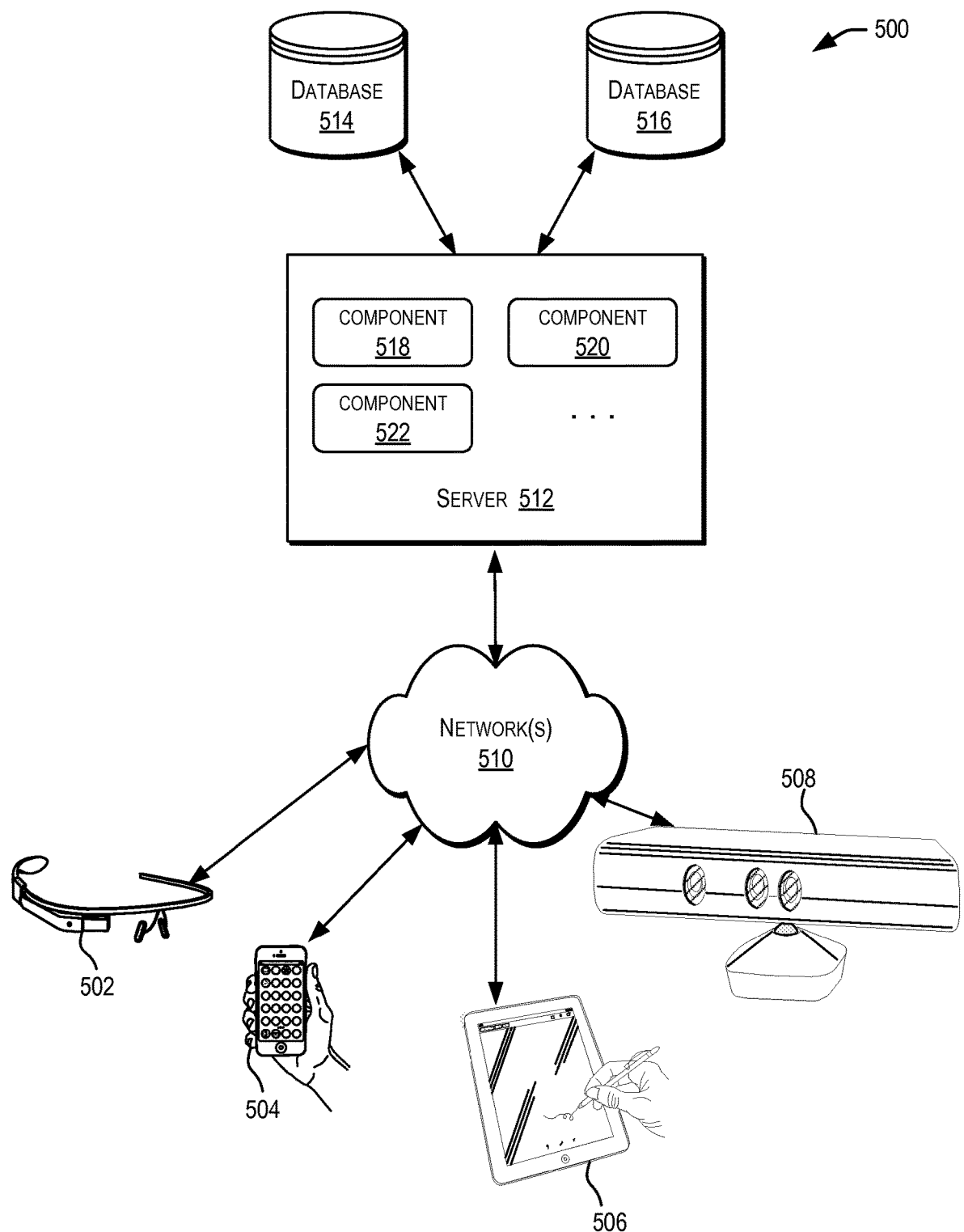
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications such as services and applications that may restrict access for a SSO session. In certain embodiments, server 512 may also provide other services or software applications can include non-virtual and virtual environments. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

Client computing devices 502, 504, 506, and/or 508 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 510.

Although distributed system 500 in FIG. 5 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network (s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking. In various embodiments, server 512 may be adapted to run one or more services or software applications described in the foregoing disclosure. For example, server 512 may correspond to a server for performing processing as described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. These databases may provide a mechanism for storing information such as user interactions information, usage patterns information, adaptation rules information, and other information used by embodiments of the present invention. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle that are adapted to store, update, and retrieve data in response to SQL-formatted commands.

Figure 6:
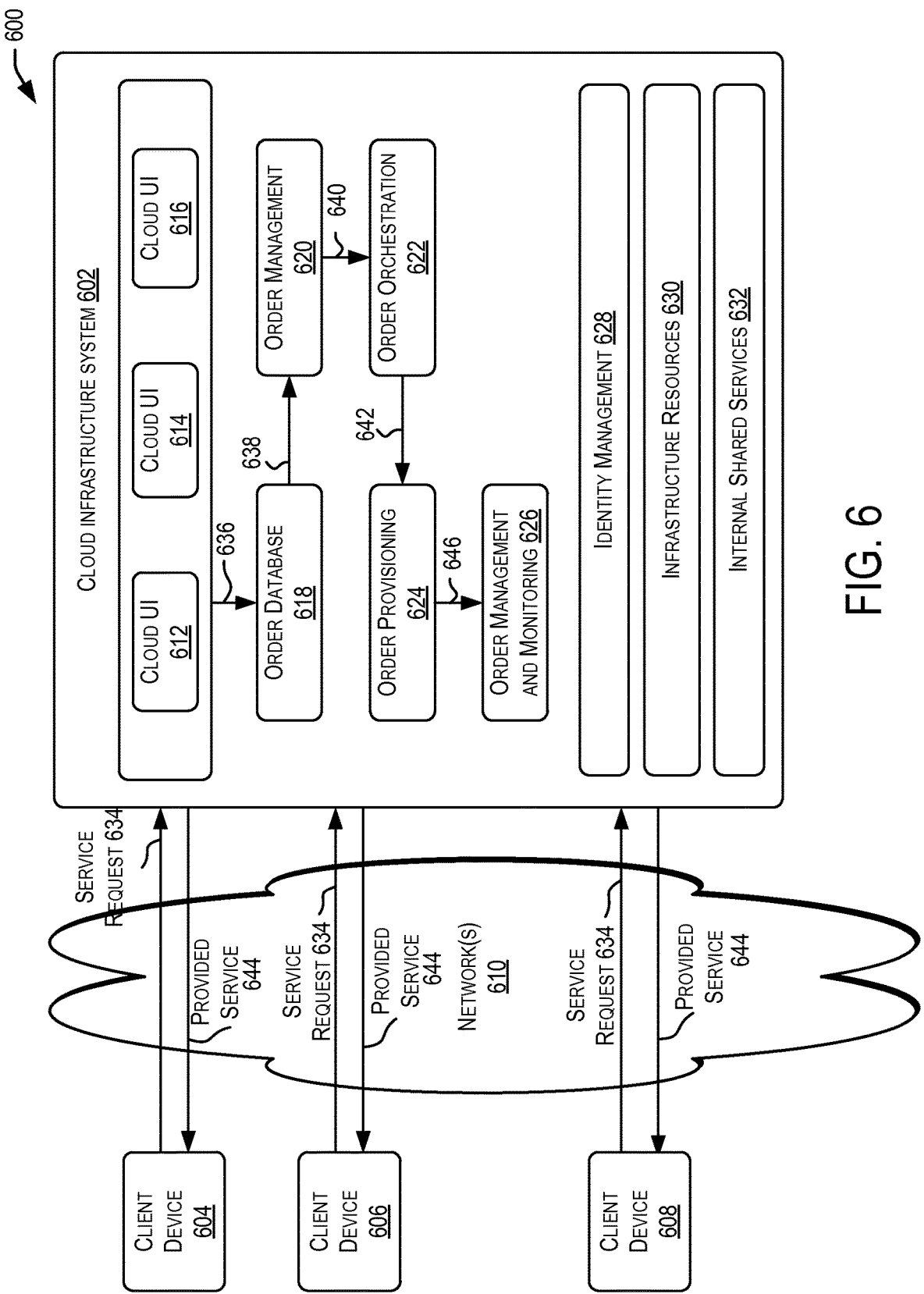
FIG. 6 illustrates a simplified block diagram of one or more components of a system environment in which services may be offered as cloud services, in accordance with an embodiment of the present disclosure.

In some embodiments, a cloud environment may provide one or more services for restricting access for a SSO session. FIG. 6 is a simplified block diagram of one or more components of a system environment 600 in which services may be offered as cloud services, in accordance with an embodiment of the present disclosure. In the illustrated embodiment in FIG. 6, system environment 600 includes one or more client computing devices 604, 606, and 608 that may be used by users to interact with a cloud infrastructure system 602 that provides cloud services, including services for restricting access for a SSO session. Cloud infrastructure system 602 may comprise one or more computers and/or servers that may include those described above for server 512.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for client computing devices 502, 504, 506, and 508. Client computing devices 604, 606, and 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602. Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between client computing devices 604, 606, and 608 and cloud infrastructure system 602. Each network may be any type of network familiar to those skilled in the art that can support data communications using any of a variety of commercially-available protocols, including those described above for network(s) 510.

In certain embodiments, services provided by cloud infrastructure system 602 may include a host of services that are made available to users of the cloud infrastructure system on demand. In addition to services related to restricting access for a SSO session, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle Corporation) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform, and other resources.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 to enable provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In an exemplary operation, at step 634, a customer using a client device, such as client computing devices 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI) such as cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

At step 636, the order information received from the customer may be stored in an order database 618. If this is a new order, a new record may be created for the order. In one embodiment, order database 618 can be one of several databases operated by cloud infrastructure system 618 and operated in conjunction with other system elements.

At step 638, the order information may be forwarded to an order management module 620 that may be configured to perform billing and accounting functions related to the order, such as verifying the order, and upon verification, booking the order.

At step 640, information regarding the order may be communicated to an order orchestration module 622 that is configured to orchestrate the provisioning of services and resources for the order placed by the customer. In some instances, order orchestration module 622 may use the services of order provisioning module 624 for the provisioning. In certain embodiments, order orchestration module 622 enables the management of business processes associated with each order and applies business logic to determine whether an order should proceed to provisioning.

As shown in the embodiment depicted in FIG. 6, at step 642, upon receiving an order for a new subscription, order orchestration module 622 sends a request to order provisioning module 624 to allocate resources and configure resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. This enables order orchestration module 622 to be isolated from implementation details, such as whether or not services and resources are actually provisioned on the fly or pre-provisioned and only allocated/assigned upon request.

At step 644, once the services and resources are provisioned, a notification may be sent to the subscribing customers indicating that the requested service is now ready for use. In some instance, information (e.g. a link) may be sent to the customer that enables the customer to start using the requested services.

At step 646, a customer's subscription order may be managed and tracked by an order management and monitoring module 626. In some instances, order management and monitoring module 626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 600 may include an identity management module 628 that is configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

FIG. 7 illustrates an exemplary computer system 700 that may be used to implement an embodiment of the present invention. In some embodiments, computer system 700 may be used to implement any of the various servers and computer systems described above. As shown in FIG. 7, computer system 700 includes various subsystems including a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above for restricting access for a SSO session.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present invention.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client computing devices via the Internet for receiving and sending information from and to the client computing devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, by a computer system from a client device operated by a first user, a request to access a first resource;
   requesting, by the computer system, credential data from the first user to access the first resource;
   in response to the request for the credential data, receiving, by the computer system from the client device operated by the first user, the credential data and scope information for establishing a session, wherein the scope information is provided by the first user and defines a first group of resources that are accessible by the client device during the session and/or a second group of resources that are restricted from access by the client device during the session, and wherein the first group of resources include the first resource that the first user is requesting to access;
   determining, by the computer system, the credential data for the first user is valid;
   in response to determining the credential data is valid, establishing, by the computer system, the session with the client device;
   determining, by the computer system, a scope of authentication for the session based on the scope information provided by the first user;
   configuring, by the computer system, the session for the client device based on the scope of authentication, wherein the session is configured to allow the client device to access the first group of resources during the session and/or restrict the client device from accessing the second group of resources during the session;
   determining, by the computer system, the first user operating the client device is authorized to access the first resource based on the configuration of the session; and
   in response to determining the first user operating the client device is authorized to access the first resource, sending, by the computer system, an authorization message to the client device to allow the first user to access the first resource.

2. The method of claim 1, further comprising:
   upon configuring the session for the client device, receiving, by the computer system from the client device operated by a second user, a request to access a second resource within the session, wherein the second user is a same or different user from the first user;
   determining, by the computer system, the second user operating the client device is not authorized to access the second resource based on the configuration of the session, wherein the second group of resources include the second resource that the second user is request to access; and
   in response to determining the second user operating the client device is not authorized to access the second resource, sending, by the computer system, an authorization message to the client device to deny the second user access to the second resource.

3. The method of claim 2, wherein the first resource corresponds to a first application and the second resource corresponds to a second application.

4. The method of claim 2, wherein at least one of the first resource or the second resource is identified by a uniform resource identifier (URI).

5. The method of claim 1, wherein the session is single-sign-on (SSO) session.

6. The method of claim 1, wherein the scope information is provided by the first user in an interface provided by the client device, and wherein the interface includes one or more interactive elements to enable the first user to define the first group of resources and the second group of resources.

7. A system comprising:
a memory; and
one or more processors coupled to the memory and configured to:
receive, from a client device operated by a first user, a request to access a first resource;
requesting credential data from the first user to access the first resource;
in response to the request for the credential data, receive, from the client device operated by the first user, the credential data and scope information for establishing a session, wherein the scope information is provided by the first user and defines a first group of resources that are accessible by the client device during the session and/or a second group of resources that are restricted from access by the client device during the session, and wherein the first group of resources include the first resource that the first user is requesting to access;
determine the credential data for the first user is valid;
in response to determining the credential data is valid, establish the session with the client device;
determine a scope of authentication for the session based on the scope information provided by the first user;
configure the session for the client device based on the scope of authentication, wherein the session is configured to allow the client device to access the first group of resources during the session and/or restrict the client device from accessing the second group of resources during the session;
determine the first user operating the client device is authorized to access the first resource based on the configuration of the session; and
in response to determining the first user operating the client device is authorized to access the first resource, sending an authorization message to the client device to allow the first user to access the first resource.

8. The system of claim 7, wherein the one or more processors are further configured to:
upon configuring the session for the client device, receive from the client device operated by a second user, a request to access a second resource within the session, wherein the second user is a same or different user from the first user;
determine the second user operating the client device is not authorized to access the second resource based on the configuration of the session, wherein the second group of resources include the second resource that the second user is request to access; and
in response to determining the second user operating the client device is not authorized to access the second resource, send an authorization message to the client device to deny the second user access to the second resource.

9. The system of claim 7, wherein the scope information is provided by the first user in an interface provided by the client device, and wherein the interface includes one or more interactive elements to enable the first user to define the first group of resources and the second group of resources.

10. The system of claim 7, wherein the session is single-sign-on (SSO) session.

11. A non-transitory computer-readable medium storing a set of instructions that are executable by one or more processors to:
receive, from a client device operated by a first user, a request to access a first resource;
requesting credential data from the first user to access the first resource;
in response to the request for the credential data, receive, from the client device operated by the first user, the credential data and scope information for establishing a session, wherein the scope information is provided by the first user and defines a first group of resources that are accessible by the client device during the session and/or a second group of resources that are restricted from access by the client device during the session, and wherein the first group of resources include the first resource that the first user is requesting to access;
determine the credential data for the first user is valid;
in response to determining the credential data is valid, establish the session with the client device;
determine a scope of authentication for the session based on the scope information provided by the first user;
configure the session for the client device based on the scope of authentication, wherein the session is configured to allow the client device to access the first group of resources during the session and/or restrict the client device from accessing the second group of resources during the session;
determine the first user operating the client device is authorized to access the first resource based on the configuration of the session; and
in response to determining the first user operating the client device is authorized to access the first resource, sending an authorization message to the client device to allow the first user to access the first resource.

12. The non-transitory computer-readable medium of claim 11, wherein the scope information is provided by the first user in an interface provided by the client device, and wherein the interface includes one or more interactive elements to enable the first user to define the first group of resources and the second group of resources.

13. The non-transitory computer-readable medium of claim 11, wherein the session is single-sign-on (SSO) session.

14. The non-transitory computer-readable medium of claim 11, wherein the set of instructions are further executable by the one or more processors to:
upon configuring the session for the client device, receive from the client device operated by a second user, a request to access a second resource within the session, wherein the second user is a same or different user from the first user;
determine the second user operating the client device is not authorized to access the second resource based on the configuration of the session, wherein the second group of resources include the second resource that the second user is request to access; and
in response to determining the second user operating the client device is not authorized to access the second resource, send an authorization message to the client device to deny the second user access to the second resource.

* * * * *